US008506763B2

(12) United States Patent
Zmood et al.

(10) Patent No.: US 8,506,763 B2
(45) Date of Patent: Aug. 13, 2013

(54) DEVICE FOR HEATING A LIQUID COMPRISING A SOLVENT AND SOLUTE, AND SEPARATING THE SOLVENT AND SOLUTION

(75) Inventors: Ronald Barry Zmood, Caulfield North (AU); Simon John Withington, Heatherton (AU); Carl Nicholas Botcher, Pascoe Vale South (AU)

(73) Assignee: Aquamill Five Star Pty Ltd, Toorak, VIC (AU)

( * ) Notice: Subject to any disclaimer, the term of this patent is extended or adjusted under 35 U.S.C. 154(b) by 0 days.

(21) Appl. No.: 13/382,601

(22) PCT Filed: Feb. 23, 2011

(86) PCT No.: PCT/AU2011/000192

§ 371 (c)(1), (2), (4) Date: Jan. 6, 2012

(87) PCT Pub. No.: WO2011/103622

PCT Pub. Date: Sep. 1, 2011

(65) Prior Publication Data

US 2012/0210592 A1 Aug. 23, 2012

(30) Foreign Application Priority Data

Feb. 23, 2010 (AU) ................................ 2010900741

(51) Int. Cl.
*B01D 3/14* (2006.01)

(52) U.S. Cl.
USPC ........ 202/182; 202/178; 202/176; 202/185.1; 202/236; 159/2.3; 159/4.08; 159/4.09

(58) Field of Classification Search
USPC ....... 202/176, 178, 182, 185.1, 236; 159/2.3, 159/4.08, 4.09; 34/74, 86
See application file for complete search history.

(56) References Cited

U.S. PATENT DOCUMENTS 3,654,705 A * 4/1972 Smith et al. ..................... 34/368
5,346,592 A * 9/1994 Madani ......................... 202/176
6,026,588 A * 2/2000 Clark et al. ...................... 34/77
6,699,369 B1 3/2004 Hartman et al.

FOREIGN PATENT DOCUMENTS

WO 2009103890 8/2009

* cited by examiner

*Primary Examiner* — Nina Bhat
(74) *Attorney, Agent, or Firm* — Hahn, Loesser & Parks LLP; Arland T. Stein

(57) ABSTRACT

A device for treating a liquid comprising a solvent and a solute, and separating the solvent and solute, the device comprising a continuous flow treatment chamber including: (a) one or more drying zones; (b) one or more return zones to circulate heating fluid continuously through drying zone(s) and return zone(s) sequentially; (c) a heating fluid inlet(s) in at least one of the return zones for the introduction of the heating fluid; (d) a circulating fan to circulate the heating fluid; (e) a liquid inlet(s) in the drying zone(s) including nozzles though which liquid to be treated is introduced in misted form into the zones; (f) a solute collector(s) located in the drying zone(s) downstream of the liquid inlet(s); wherein the introduced liquid is heated by the heating fluid and the solute is separated from the liquid in the solute collector(s).

22 Claims, 5 Drawing Sheets

DEVICE FOR HEATING A LIQUID COMPRISING A SOLVENT AND SOLUTE, AND SEPARATING THE SOLVENT AND SOLUTION

This application is a national stage of PCT Application No. PCT/AU2011/000192 filed Feb. 23, 2011, which claims priority to Australian Patent Application No. 2010900741 filed Feb. 23, 2010, both of which are hereby incorporated by reference.

BACKGROUND

This invention relates to a device for heating a liquid comprising a solvent and solute, and separating the solvent and solute. In one form of the invention, the device is adapted for liquid purification and waste treatment system.

It is the intention of the invention to provide a thermally efficient and innovative means of separating a solvent and solute. As such, in one form of the invention, it is possible to use evaporation to purify polluted industrial waste water or sea water, or the like. The application of this technology, when used for desalination purposes, also produces sodium chloride concentrate as a useable by-product.

In this specification where a document, act or item of knowledge is referred to or discussed, this reference or discussion is not an admission that the document, act or item of knowledge or any combination thereof was at the priority date publicly available, known to the public, part of the common general knowledge or known to be relevant to an attempt to solve any problem with which this specification is concerned.

Whilst the invention is described with reference to water as the liquid, it will be understood that the term "liquid" is not so limited and other liquids are useable with the invention.

This invention is also related to the invention disclosed in PCT/2005/001796 (the content of which is incorporated herein by reference).

SUMMARY OF THE DISCLOSURE

According to a first aspect of the invention a device is provided for treating a liquid comprising a solvent and a solute, and separating the solvent and solute, the device comprising a continuous flow treatment chamber including:

(a) one or more drying zones;

(b) one or more return zones to circulate heating fluid continuously through the drying zone(s) and return zone (s) sequentially;

(c) a heating fluid inlet(s) in at least one of the return zones for the introduction of the heating fluid;

(d) a circulating fan to circulate the heating fluid;

(e) a liquid inlet(s) in the drying zone(s) including one or more nozzles through which liquid to be treated is introduced in misted form into the drying zone(s);

(f) a solute collector(s) located in the drying zone(s) downstream of the liquid inlet(s);

wherein the introduced liquid is heated by the heating fluid and the solute is separated from the liquid in the solute collector(s).

The devices of the invention facilitate management of relatively large phase change energy from liquid to gas and gas to liquid by keeping it within the one operating environment. The device operates as a closed system from an energy perspective but is an open system from a mass flow perspective. Therefore only a small amount of energy input to the control components is required to manage this considerably larger energy.

Typically, where there are two of more drying zones, the drying zones are located in series and may be located substantially parallel to each other.

Preferably, the device further includes at least one heat exchanger located downstream of the solute collector(s) to increase the temperature of the heating fluid used in a downstream drying zone.

It is well known that there are impurities in water that affect its hardness. Hard water may cause scaling in conventional water treatment processes and equipment. Hardness refers to the presence of dissolved ions, mainly of calcium $Ca^{2+}$ and magnesium $Mg^{2+}$ ions which are acquired through water contact with rocks and sediments in the environment. The positive electrical charges of these ions are balanced by the presence of anions (negative ions), of which bicarbonate $HCO_3^{2-}$, carbonate $CO_3^{2-}$ and sulphate $SO_4^{2-}$ are the most important. The solubility of sulphates and bi-carbonates decrease with increasing temperature, which means that in a traditional thermal process the sulphates and carbonates preferentially form on the hottest surfaces, primarily the heat exchangers. This causes fouling (scaling) and loss of performance of the heat exchangers and results in rapid decline in system thermal performance as well as increased maintenance costs and downtime.

In the device of the present invention when applied to such water, the sulphates and carbonates are substantially trapped within the liquid droplets as they move along with the heating fluid and are dried. As such the droplets coalesce on the solute collector (mist eliminator) and drain away with the waste stream. By positioning the heat exchangers downstream of the solute collector, any adverse effect of the sulphates and carbonates is significantly reduced or eliminated as they have no material contact upon those heat exchangers. This dramatically reduces fouling of heat exchangers and significantly increases their long term thermal performance. Additionally, since the solute collectors (mist eliminators) operate at a lower temperature than the droplets, they will only cause minimal scale build-up in any event.

It will be appreciated that the devices of the invention may be controlled by conventional pressure and heat balance control systems. Computer software incorporating control loops for internal chamber pressure and heat balance control will be incorporated. The design and function of such software is within the ordinary competencies of computer programmers.

In water applications and where heat exchangers are present, as the surface water in the droplets evaporates, steam is produced. A partial stream of steam is typically taken off downstream of the solute collectors (mist eliminators). It is compressed by a compressor and fed to an upstream heat exchanger to heat the heating fluid. The control system is designed to alter the speed of the compressor to compensate for increases in chamber steam pressure. The amount of energy available to be put back into the upstream heat exchanger to maintain thermal stability is also controlled by the compressor flow rate and operating pressure. Additionally an external heat exchanger may be incorporated into the system to aid control of the steam mass balance so as to increase the stability of the system. For example, a wall of the drying zone may be provided with a continuously variable valve to vent steam mass and maintain the drying zone within set limits. The external heat exchanger is connected to the outlet of the valve to recover energy from the vented flow mass. Vented purified solute may also be recoverable.

The devices of the invention are also highly suited for treating hyper-saline solutions, and such like solutions. They are capable of operating at much higher solute concentrations than competitive membrane processes. Brine solutions and other high concentration liquids are beyond the technical or economic capabilities of reverse osmosis and other similar approaches. Those approaches require high pumping pressures which together with the cost of membranes limit the concentrations of solutions they may treat. In contrast, the devices of the invention may be operated below or above atmospheric pressure at low to medium temperatures.

In another aspect of the invention, the drying zone in which the liquid is introduced and dried may be further optimized by incorporating drying cells which are sub drying zones and recirculation of heating fluid in particular ways.

In accordance with this aspect, a device for treating a liquid is provided comprising a solvent and a solute, and separating the solvent and solute, the device comprising a continuous flow treatment chamber including:

(a) one or more drying zones, at least one of the drying zones including at least two drying cells, each drying cell having:
  (i) a liquid inlet(s) including nozzles through which liquid to be treated is introduced in misted form into the drying cell;
  (ii) a solute collector(s) located in the drying cell downstream of the liquid inlet(s); and
  (iii) a drying cell inlet for heating fluid.
(b) one or more return zones to circulate heating fluid continuously through the drying zone(s) and return zone (s) sequentially;
(c) a heating fluid inlet(s) in at least one of the return zone(s) for the introduction of the heating fluid; and
(d) a circulating fan to circulate the heating fluid;

wherein the introduced liquid is heated by the heating fluid and substantially all the solute is separated from the liquid in the solute collector(s).

In a preferred form of the invention, each drying cell further includes a heat exchanger located downstream of solute collector to increase the temperature of the heating fluid.

In another preferred form of the invention the solute collected in one drying cell is circulated to the liquid inlet of the downstream drying cell. This is known as a forward cascading injection drying system.

In a further preferred form of the invention, the solute collected in one drying cell is circulated to the liquid outlet of the upstream drying cell. This is known as a backward cascading injection drying system.

It is to be understood that the flow of solute between drying cells may take on any desirable configuration. For example, it may be a combination of the backward and forward cascading injection drying systems.

BRIEF DESCRIPTION OF THE DRAWINGS

The invention is now further illustrated with reference to the figures in which.

DETAILED DESCRIPTION OF THE DRAWINGS

Figure 1:
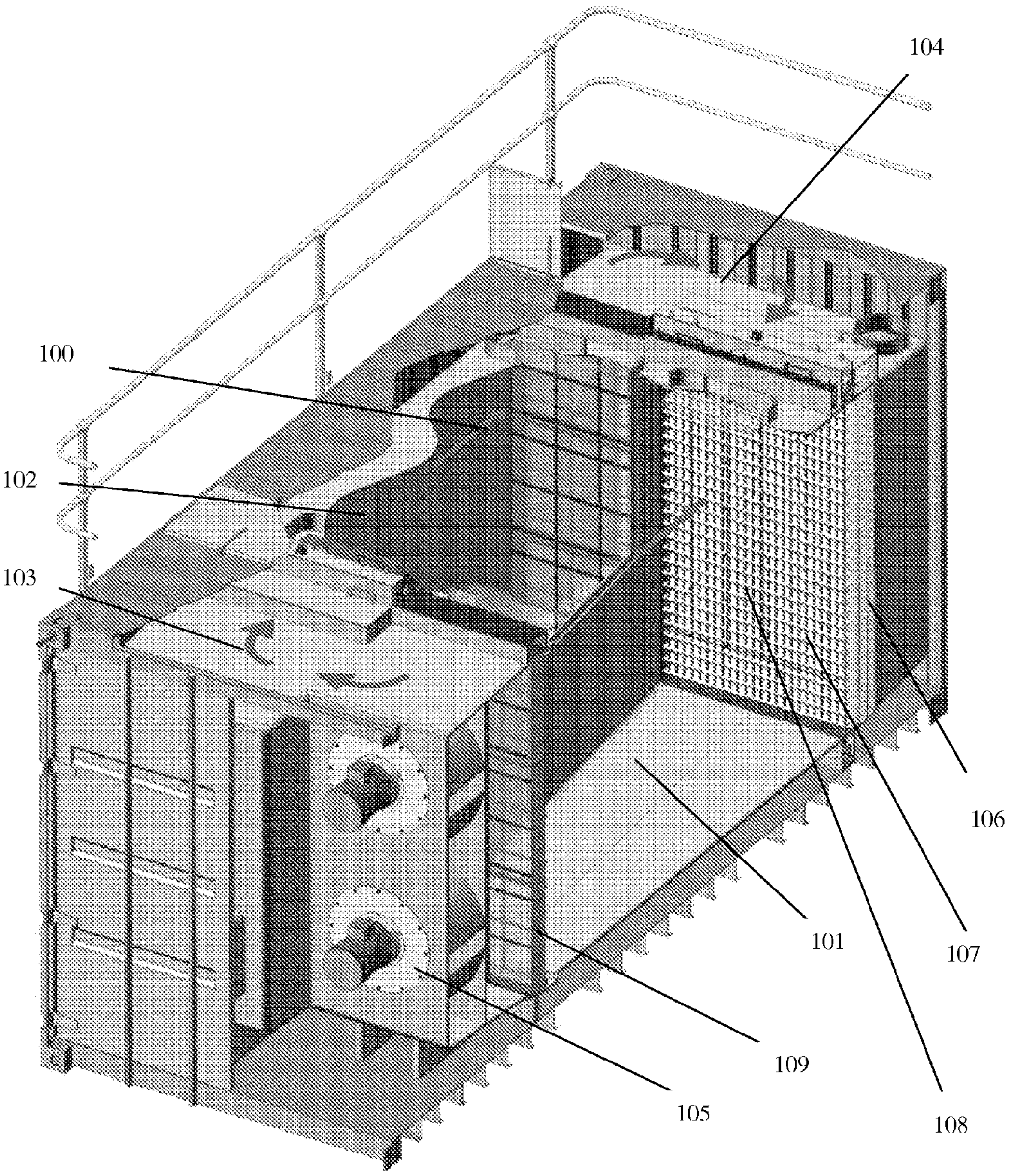
FIG. 1 is a sectioned view of the continuous flow treatment chamber.

A sectioned view of the main chamber is shown in FIG. 1. In this figure the arrows show the flow paths followed by the gas filling the chamber. In operation this gas 100 consists of a mixture of super-heated steam at close to atmospheric pressure, and contaminated water droplets which travel along the left- and right-hand drying zones 101, 102. However, it will be understood that that there can be significant advantages in some cases in operating the process at pressures well above or below atmospheric pressure. For example if we operate at well below atmospheric pressure then we can operate the chamber temperature at say 50 deg C., which is below the saturation concentration inversion temperatures for Mg and Ca salts.

Figure 2:
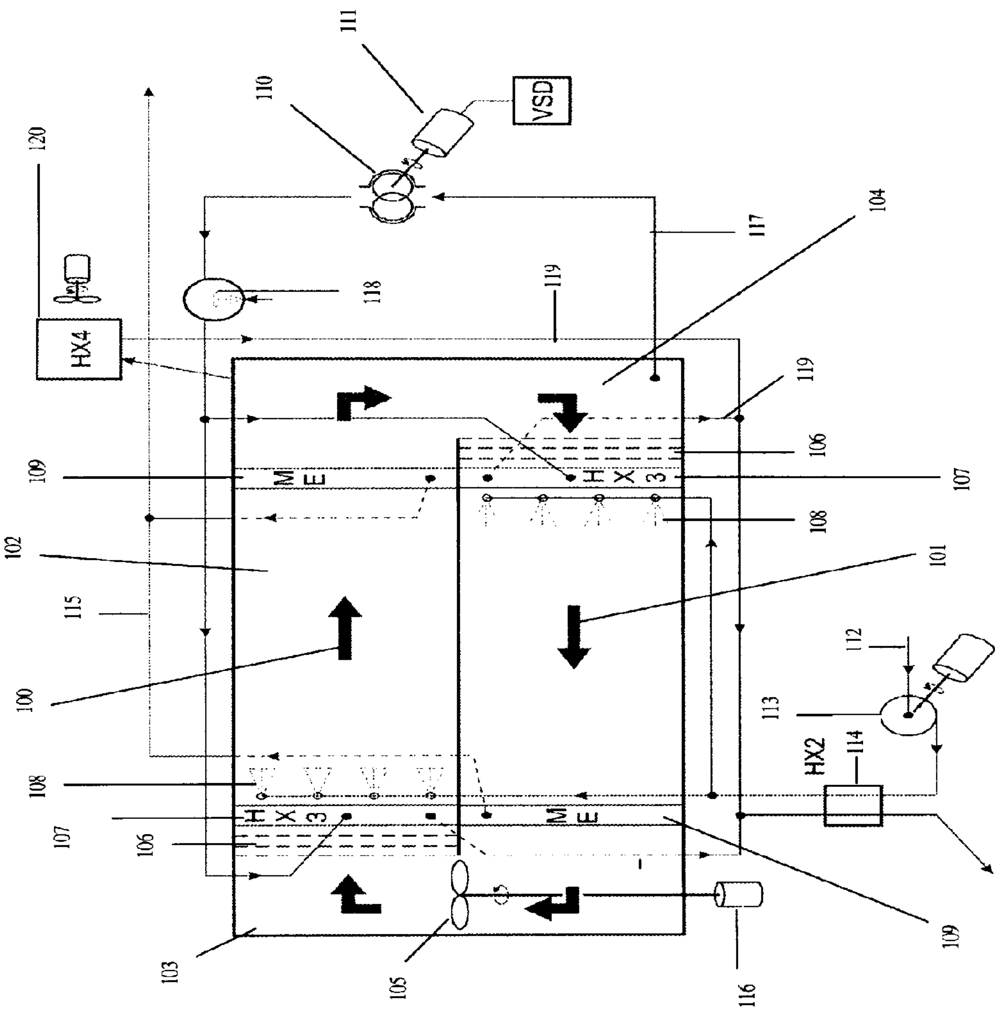
FIG. 2 is a process flow diagram of the chamber illustrated in FIG. 1.

These zones will be referred to in the description of FIGS. 1 & 2 as zones A, 101, and B, 102, respectively. The drying zones are joined at the front and rear ends by the fan end box 103 (zone) and return end box 104 (zone) respectively. They thus form a closed circuit with the heating gas being driven around it by the circulating fans 105, in a manner akin to an aerodynamic wind-tunnel.

In each drying zone 101 and 102 shown there are a number of elements required for the operation of the device. At the gas entry end of each zone, in the direction of the gas flow, there is first a set of flow straightening screens 106, followed by a heat exchanger (HX3) 107 and then a spray nozzle assembly 108. At the gas exit end of each zone there is a mist eliminator (ME) 109. The purpose of the flow straightening screens 106 is to ensure uniformly distributed gas flow over the heat exchangers 107 and smooth gas flow in the drying zones 101 and 102.

In addition to the main chamber (zones A and B) 101, 102, the system includes a compressor 110 and motor 111, which is used as part of the open Rankine cycle heat pump. This component is only shown in FIG. 2 and typically draws steam from the return end box 104, compresses it, and then feeds it to the heat exchangers HX3 107 where it condenses and yields the purified water product stream of the machine. A consequence of this scheme is that the heat energy given up by the condensing steam is used to heat the gas in the main chamber 101, 102. As a result, a significant proportion of the thermal energy contained in the condensing steam is re-cycled in the process thus increasing the overall energy efficiency by a significant factor.

The contaminated feedwater 112 which is to be purified is pre-filtered and chemically treated prior to being fed to the device. This feedwater is pumped by a high pressure pump 113 through a heat exchange 114 to the misting spray nozzles 108 and mixed with the circulating gas 100 in the drying zones (A and B) 101, 102. As the fine mist travels down the drying zones 101, 102, heat energy is exchanged between the gas 100 and the droplets thus causing water in the droplets to evaporate and form steam. As a result the mass of the droplets decreases and the salt concentration within each droplet increases. After the droplets have travelled a distance down the drying zone and the bulk of the water within them has been removed, the remaining droplets are collected by the mist eliminators 107 and collected at the base of the machine as the concentrate stream 115.

As purely illustrative, in the operation of the process the droplet diameter may be, for example, in the range 15 to 40 μm, and the gas velocity in the range 1 to 3.5 m/s. For an $NaCl/H_2O$ solution of 3.5 percent by mass (typical of seawater) it has been experimentally demonstrated that the concentrate volumetric flow rate is significantly below 30 percent of the contaminated feedwater flow rate. In addition it has been demonstrated that the condensate stream meets potable water standards.

As can be seen from FIG. 2, the main chamber is composed of two droplet drying zones 101, 102, and the fan-end and return-end boxes 104, 105. As shown the chamber gas 100 is driven around the closed circuit by circulating fans 105 whose drive motor speeds are controlled by an electronic variable speed drive (VSD) 116. As the drying process for both zones is essentially the same, the following explanation concentrates on Zone B 101.

Following the gas 100 along the Zone B, it is essentially dry super heated steam as it exits the fan end box 103 and enters the screens 106 whose purpose is to straighten up the gas flow and to ensure the flow velocity is uniform across the face of the heat exchanger HX3 107. Typically the steam will be at or near atmospheric pressure with slight superheat as it enters the heat exchanger and exits with a temperature rise of around 10° C. to 20° C.

Immediately following the heat exchanger 107 is the spray nozzle array 108 which emits a spray of finely atomized contaminated feedwater at a temperature of approximately 99° C. which travels down the zone 102 mixed with the steam exiting from HX3 107. Because of the droplet's close proximity to the surrounding steam there is significant heat transfer from the superheated steam to the droplets. By the time the droplets have reached the mist eliminator ME 109 the bulk of its water content has evaporated into steam, and the contaminants are concentrated in the remaining droplets. Experience has shown that over 70 percent of the water can be evaporated during this process. A feature of this evaporation process is that it occurs in a volume devoid of hot heat transfer surfaces so that problems of scale formation on the hot surfaces, particularly by $Mg^{2+}$ and $Ca^{2+}$ ionic compounds, is considerably reduced.

Because of the heat transfer from the steam to the water droplets as they travel together along the drying zone 102 there is a corresponding drop in the steam temperature from its exit temperature to a few degrees of superheat. Since this heat transfer process cannot occur instantaneously the length of the drying zone 102 needs to be carefully selected to ensure adequate time for the drying process to occur. The relationship between the drying zone length, the gas velocity, the droplet size, the initial dissolved salt concentration, the heat exchanger exit temperature, the temperature gradient along the zone and the required concentrate yield is exceedingly complex; but is subject to mathematical modelling and computer simulation.

As mentioned above when the droplets arrive at the mist eliminator 109 under the above operating conditions they contain less than 30 percent of their initial mass of water. By varying the operating conditions, and especially the operating temperatures and drying length, the magnitude of the concentrate yield can be controlled within a wide range so that if necessary it can be reduced to less than 5 percent of the initial mass of water.

Once the gas loaded with the dried droplets arrives at the mist eliminator 109 it functions to separate the droplets from the gas 100. The gas 100 passes through the eliminator 109 as dry superheated steam, while the droplets collect on the eliminator and drain under gravity into the concentrate drainage pipe-work 115. Typically, the mist eliminator 109 can separate the droplets from the gas 100 with almost 100 percent efficiency so long as the droplet diameters do not fall below a critical size of about 5 μm. For the present experimental designs it is important to control the spray droplet diameters so that this critical size limit is not breached. After passing through the mist eliminator 109 the gas 100 flows around the return end box 104 and enters Zone A 101, where the process described for Zone B is repeated.

To improve the operating efficiency of the device a number of steps of energy recovery have been implemented as discussed below.

Main Compressor Circuit

As discussed above, each HX3 107 is used to raise the gas temperature flowing around the main chamber by around 10° C. to 20° C. To supply the heat energy to achieve this, superheated steam is drawn into the compressor suction line 117, as shown in FIG. 2, from the return end box 104 and fed to the compressor inlet port 110. This steam is typically adiabatically compressed in the compressor 110 to a pressure ratio in the range of 1.7-2.0. In addition compressor cooling water is injected into the inlet cooling port so as to ensure that the steam temperature at the compressor output is only slightly above the steam saturation temperature $T_{sat}$ for the selected pressure ratio. Under some circumstances additional de-superheat water needs to be injected closer to the heat exchanger inlets as shown at 118 in FIG. 2. The saturated steam is then fed to the two HX3 heat exchangers 107 and since its temperature exceeds the gas inlet temperature to each HX3 107, heat energy will be transferred from the inlet steam to the gas. As a result of this heat transfer the steam will condense to water, and HX3 107 may thus be termed a condensing heat exchanger.

As a result of the steam condensation in each HX3 107, the latent heat of vaporization of the steam is effectively recovered and used to heat the gas in the main chamber 101, 102 as it passes through each heat exchanger 107. The condensate, which is purified water, is then collected from the bottom of each HX3 107 and fed out through the condensate line 119 to heat exchanger HX2 114.

It will be noted that this energy recovery is achieved by the compressor doing mechanical work and thus the process is not in contravention of the second Law of Thermodynamics.

Feedwater Circuit

The condensate leaves the bottom of each HX3 107 at the saturation temperature corresponding to the selected compressor pressure ratio and is fed to heat exchanger HX2 114 which is used to recover the sensible heat in the condensate when it is discharged at near ambient temperature. This sensible heat is used to pre-heat the contaminated feedwater 112 prior to being fed to the spray nozzles 108.

Main Chamber Mass Balance Circuit

To maintain heat and mass balance in the main chamber an additional heat exchanger HX4 120 is used. Steam is drawn off the return end box 104 and fed to HX4 120 where it is condensed and then fed to the condensate line 119. The mass of steam drawn off is controlled by a control valve (not shown) so as to preferably maintain the main chamber pressure at ±500 Pa around atmospheric pressure. This heat exchanger 120 also has a secondary effect of varying the heat balance of the main chamber and so can be used for fine-tuning the chamber internal temperatures.

Cascade Multi-Staging

Figure 3:
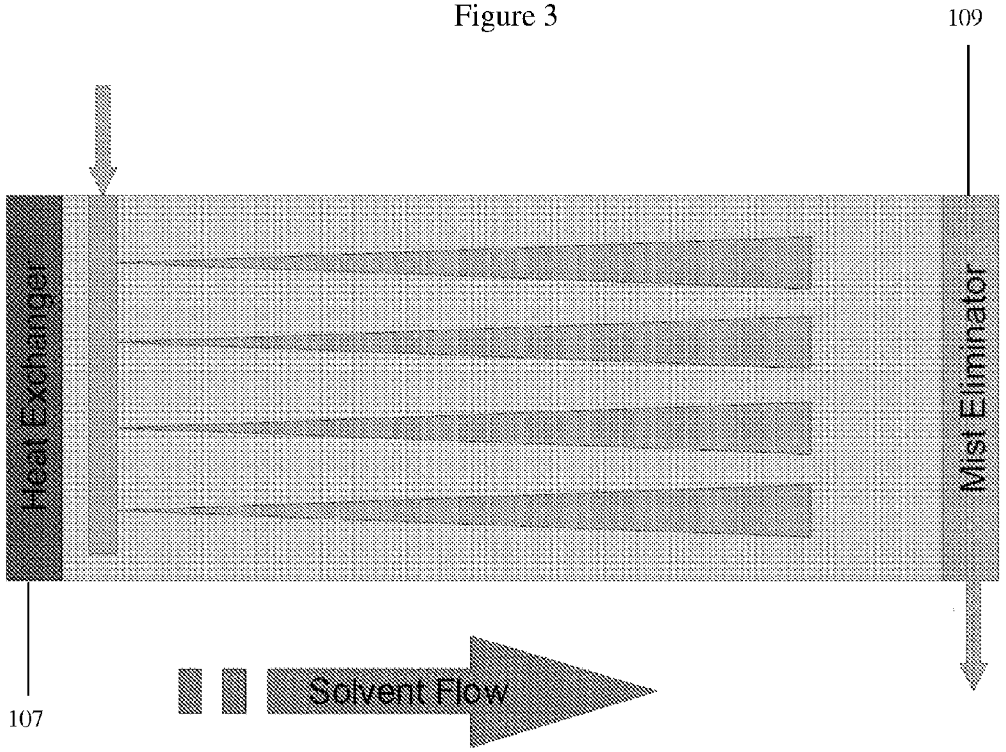
FIG. 3 is a drawing of a drying zone of the invention.

In cascade multi-staging the treated liquid is injected into the drying zone multiple times rather than using a single, long, drying zone. The original drying zone concept as illustrated in FIG. 3 consists of one heat exchanger 107 placed at the drying zone 102 inlet in front of a nozzle system 108. At the end of the drying zone 102, a solute collector (mist eliminator) 109 is placed to collect the solute but let the solvent gas pass through.

Figure 4:
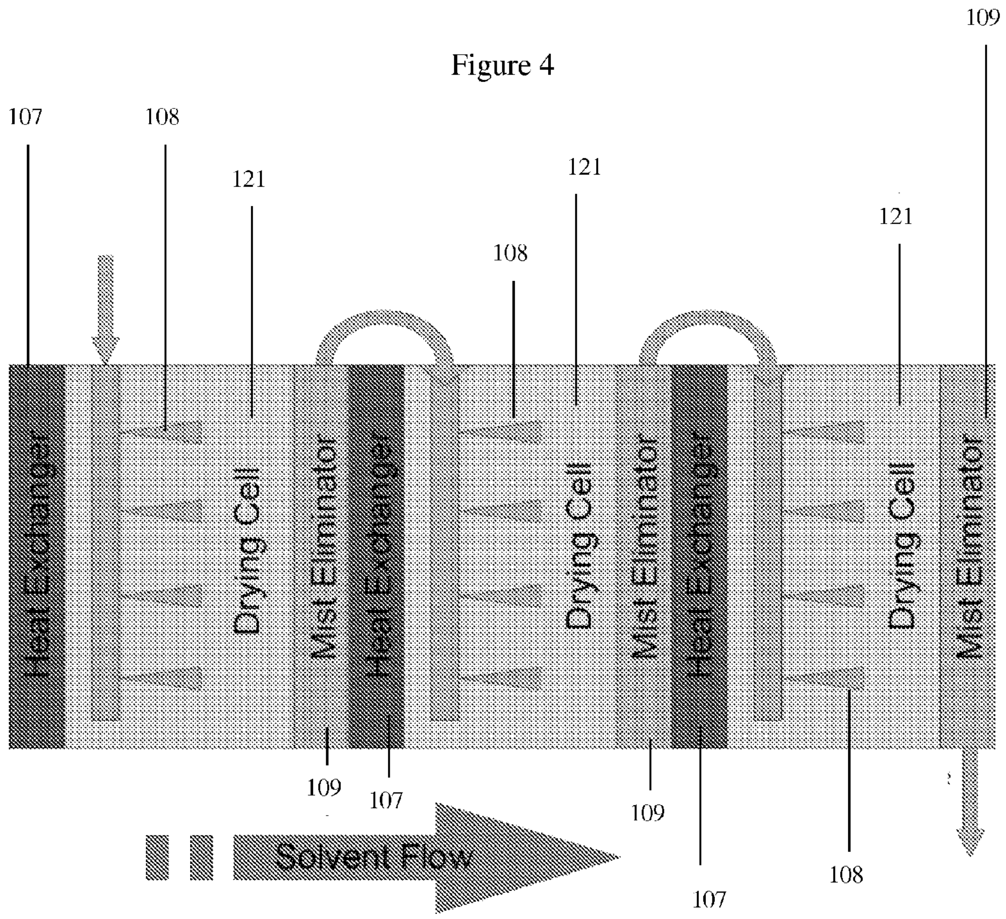
FIG. 4 is a drawing of a forward cascade injection drying zone of the invention.
Figure 5:
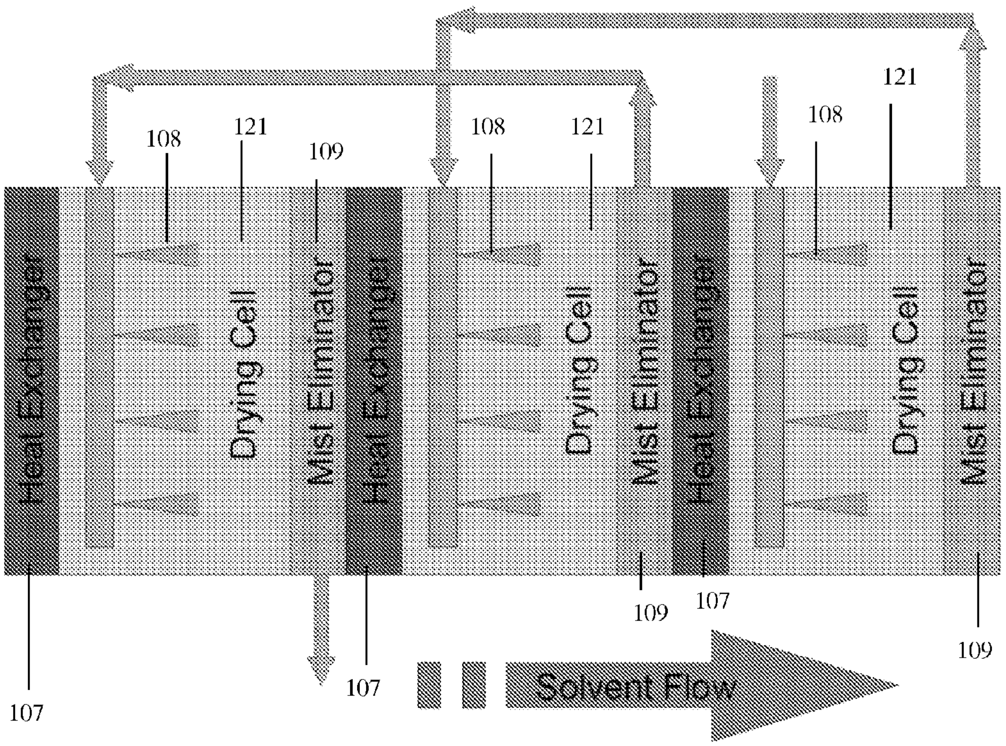
FIG. 5 is a drawing of a backward cascade injection drying zone of the invention.

Cascade multi-staging breaks up each drying zone 102 into a number of sub-zones along the path of the liquid being treated to form mini drying cells 121. As shown in FIGS. 4 and 5, each drying cell 121 consists of one heat exchanger 107 and nozzle assembly 108 at the inlet, and solute collector (mist eliminator) 109 at the downstream, outlet end of the drying cell 121.

The general mode of operation is as follows:

- the liquid to be treated is initially sprayed through nozzles 108 into the first drying cell 121 where a percentage of each droplet is evaporated by interaction with the heating fluid and then collected by the downstream solute collector (mist eliminator) 109.
- the solute so collected is circulated to another drying cell 121 pumped through the nozzles 198 of that drying cell 121 where those droplets are evaporated further and collected at the end of that drying cell 121 in the downstream solute collector (mist eliminator) 109.
- the same sequence is followed in relation to other drying cells 121.

By way of example only, cascade multi-staging may have two configurations as discussed below. However, there are innumerable possible arrangements of multi-staging which will be readily apparent to those skilled in the art.

First is forward-cascading along the length of the drying zone where the drying cells are located sequentially along the solvent steam path. The second is a backward-cascading where the initial injection takes place in a drying cell and the collected solute is circulated to an upstream drying cell.

It will be also understood that an approach which uses a combination of the two is possible.

Forward Cascade Injection

This configuration is depicted in FIG. 4. The first drying cell 121 is placed at the start of the drying zone and subsequent drying cells 121 are placed serially along the drying zone until the final drying cell 121 as shown. Each drying cell 121 takes advantage of the drying zone phenomenon that droplet evaporation is not a linear function of the drying length of the entire drying zone. It is believed that the evaporation function is closer to a logarithm response, so a higher proportion of mass is lost from each droplet at the beginning of the drying zone where the temperature difference between the solvent gas and solution droplets is highest.

The advantages of forward cascade injection over a normal drying zone are that drying cells are simple to arrange, and pumping with collected solute are easily designed. A penalty capital cost is incurred with more heat exchangers, solute collectors (mist eliminators), nozzles and pumps required than a simple extended drying zone. However, significantly higher processing volumetric throughput is achieved using drying cells while there is only a marginal increase in cost. In addition, closer control can be achieved in the droplet drying process with this approach.

Backward Cascade Injection

A further variation of the cascade multi-staging is to use backward cascade where the drying cells 121 are placed in reverse order relative to the fluid flow. As illustrated in FIG. 5, instead of the first drying cell 121 being placed at the beginning of the drying zone, it is instead placed at the end of the drying zone. Each subsequent drying cell 121 is placed in front of the previous until the start of the drying zone is reached. Essentially the higher concentrate collected solute is circulated backwards through the drying zone process.

This configuration has the advantage of using greater differences in temperature within the overall drying zone compared with forward cascade injection, and hence allows further shrinkage of the drying zone. However, there are additional costs with this configuration as the pumping mass flows need to closely managed and a higher order control system is required to balance the mass and energy flows within the system. Whilst three drying cells are shown in the FIGS. 4 and 5, the number of drying cells in a drying zone is not so limited.

The word 'comprising' and forms of the word 'comprising' as used in this description and in the claims does not limit the invention claimed to exclude any variants or additions.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

The invention claimed is:

1. A flash distillation device for treating a liquid comprising a solvent and a solute, and separating the solvent and solute, the device comprising a continuous flow treatment chamber at about atmospheric pressure including:

(a) one or more drying zones;

(b) one or more return zones to circulate heating fluid continuously through drying zone(s) and return zone(s) sequentially, the heating fluid including a fluid which contains the same molecules as the solvent;

(c) a heating fluid inlet(s) in at least one of the return zones for the introduction of the heating fluid;

(d) a circulating fan to circulate the heating fluid;

(e) a liquid inlet(s) in the drying zone(s) including nozzles though which liquid to be treated is introduced in misted form into the zones;

(f) a solute collector(s) located in the drying zone(s) downstream of the liquid inlet(s);

wherein the introduced liquid is heated by the heating fluid and the solute is separated from the liquid in the solute collector(s).

2. The device of claim 1 wherein at least two of the drying zones are located in series.

3. The device of claim 1 wherein at least two of the drying zones are located substantially parallel to each other.

4. The device of claim 1, further including at least one heat exchanger located downstream of the solute collector to increase the temperature of the heating fluid.

5. The device of claim 1 wherein at least one of the drying zones include at least two drying cells, each drying cell having:

a) a liquid inlet(s) including nozzles though which liquid to be treated is introduced in misted form into the drying cell;

b) a solute collector(s) located in the drying cell downstream of the liquid inlet(s); and c) a drying cell inlet for heating fluid.

6. The device of claim 5 where each drying cell further includes a heat exchanger located downstream of the solute collector(s) to increase the temperature of the heating fluid.

7. The device of claim 5 wherein the solute collected in one drying cell is circulated to the liquid inlet of a downstream drying cell.

8. The device of claim 5 wherein the solute collected in one drying cell is circulated to the liquid outlet of an upstream drying cell.

9. The device of claim 1 wherein the heating fluid comprises predominantly the same molecules as the solvent.

10. The device of claim 6 further including:

(i) a take off outlet located between the solute collector and heat exchanger through which a sub-stream of heating fluid may pass; and (ii) a compressor to receive and compress the sub-stream from the take off outlet; and wherein the heat exchanger includes (i) an inlet to receive the compressed sub-stream of heating fluid, the sub-stream being permitted to condense in heat exchange relationship with the circulating heating fluid to heat the circulating heating fluid; and (ii) an outlet for the condensed sub-stream of heating fluid.

11. The device of claim 10 further including at least one pre-heating heat exchanger located in heat exchange relationship between the liquid to be treated and the condensed sub-stream of heating fluid, to heat the liquid to be treated prior to the liquid being introduced into the drying zone(s).

12. The device of claim 11 further including:

(a) a second take off outlet located between the solute collector and heat exchanger through which a second sub-stream of heating fluid may pass; and (b) at least one supplementary heat exchanger to condense the second sub-stream;

wherein the supplementary heat exchanger includes (i) an inlet to receive the second sub-stream of heating fluid, and (ii) an outlet for the condensed second sub-stream of heating fluid; and wherein the condensed second sub-stream is combined with the condensed sub-stream prior to or in the pre-heating heat exchanger.

13. A flash distillation device for treating a liquid comprising a solvent and a solute, and separating the solvent and solute, the device comprising:

(A) a continuous flow treatment chamber including:

(a) one or more drying zones;

(b) one or more return zones to circulate heating fluid continuously through drying zone(s) and return zone (s) sequentially, the heating fluid including a fluid which contains the same molecules as the solvent;

(c) a heating fluid inlet(s) in at least one of the return zones for the introduction of the heating fluid;

(d) a circulating fan to circulate the heating fluid;

(e) a liquid inlet(s) in the drying zone(s) including nozzles though which liquid to be treated is introduced in misted form into the zones; and (f) a solute collector(s) located in the drying zone(s) downstream of the liquid inlet(s);

wherein the introduced liquid is heated by the heating fluid and the solute is separated from the liquid in the solute collector(s);

(B) at least one heat exchanger located downstream of the solute collector to increase the temperature of the heating fluid;

(C) a take off outlet located between the solute collector and heat exchanger through which a sub-stream of heating fluid may pass; and (D) a compressor to receive and compress the sub-stream from the take off outlet;

wherein the heat exchanger includes (i) an inlet to receive the compressed sub-stream of heating fluid, the sub-stream being permitted to condense in heat exchange relationship with the circulating heating fluid to heat the circulating heating fluid; and (ii) an outlet for the condensed sub-stream of heating fluid.

14. The device of claim 13 wherein at least two of the drying zones are located in series.

15. The device of claim 13 wherein at least two of the drying zones are located substantially parallel to each other.

16. The device of claim 13 wherein at least one of the drying zones include at least two drying cells, each drying cell having:

(i) a liquid inlet(s) including nozzles though which liquid to be treated is introduced in misted form into the drying cell;

(ii) a solute collector(s) located in the drying cell downstream of the liquid inlet(s); and (iii) a drying cell inlet for heating fluid.

17. The device of claim 16 wherein the solute collected in one drying cell is circulated to the liquid inlet of a downstream drying cell.

18. The device of claim 16, wherein the solute collected in one drying cell is circulated to the liquid outlet of an upstream drying cell.

19. The device of claim 13 further including at least one pre-heating heat exchanger located in heat exchange relationship between the liquid to be treated and the condensed sub-stream of heating fluid, to heat the liquid to be treated prior to the liquid being introduced into the drying zone(s).

20. The device of claim 19 further including:

(a) a second take off outlet located between the solute collector and heat exchanger through which a second sub-stream of heating fluid may pass; and (b) at least one supplementary heat exchanger to condense the second sub-stream;

wherein the supplementary heat exchanger includes (i) an inlet to receive the second sub-stream of heating fluid, and (ii) an outlet for the condensed second sub-stream of heating fluid; and wherein the condensed second sub-stream is combined with the condensed sub-stream prior to or in the pre-heating heat exchanger.

21. The device of claim 13 wherein the heating fluid comprises predominantly the same molecules as the solvent.

22. The device of claim 13 wherein the treatment chamber is at about atmospheric pressure.

* * * * *

UNITED STATES PATENT AND TRADEMARK OFFICE

CERTIFICATE OF CORRECTION

PATENT NO. : 8,506,763 B2
APPLICATION NO. : 13/382601
DATED : August 13, 2013
INVENTOR(S) : Ronald Barry Zmood et al.

It is certified that error appears in the above-identified patent and that said Letters Patent is hereby corrected as shown below:

On the Title Page

In the Abstract:
Line 10
delete “nozzles though which liquid to be treated is introduced in”
insert -- nozzles through which liquid to be treated is introduced in --

In the Claims

In Claim 1:
Column 8, line 30
delete “though which liquid to be treated is introduced in misted”
insert -- through which liquid to be treated is introduced in misted --

In Claim 5:
Column 8, line 47
delete “a) a liquid inlet(s) including nozzles though which liquid to”
insert -- a) a liquid inlet(s) including nozzles through which liquid to --

In Claim 13:
Column 9, line 40
delete “nozzles though which liquid to be treated is intro-”
insert -- nozzles through which liquid to be treated is intro- --

In Claim 16:
Column 10, line 17
delete “(i) a liquid inlet(s) including nozzles though which liquid”
insert -- (i) a liquid inlet(s) including nozzles through which liquid --

Signed and Sealed this
Fifteenth Day of October, 2013

Teresa Stanek Rea
*Deputy Director of the United States Patent and Trademark Office*